United States Patent
Mattsson et al.

(10) Patent No.: US 8,808,136 B2
(45) Date of Patent: Aug. 19, 2014

(54) WORKING MACHINE AND A METHOD FOR OPERATING A WORKING MACHINE

(75) Inventors: Per Mattsson, Hindås (SE); Andreas Nordstrand, Eskilstuna (SE); Rikard Mäki, Eskiltuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 206 days.

(21) Appl. No.: 13/319,093

(22) PCT Filed: May 7, 2009

(86) PCT No.: PCT/SE2009/000231
§ 371 (c)(1),
(2), (4) Date: Dec. 12, 2011

(87) PCT Pub. No.: WO2010/128897
PCT Pub. Date: Nov. 11, 2010

(65) Prior Publication Data
US 2012/0100956 A1    Apr. 26, 2012

(51) Int. Cl.
*B60W 20/00* (2006.01)
*B60W 10/08* (2006.01)

(52) U.S. Cl.
USPC .............................. 477/3; 180/53.4; 180/53.5

(58) Field of Classification Search
USPC ............... 477/3, 52, 68; 180/53.4, 53.5, 53.8, 180/65.285, 65.29, 306, 307
See application file for complete search history.

(56) References Cited

U.S. PATENT DOCUMENTS 4,153,128 A * 5/1979 Heitmeyer et al. .......... 180/65.7
6,056,657 A   5/2000 Garnett
(Continued)

FOREIGN PATENT DOCUMENTS

JP    2008062822 A2   3/2008
WO      9408156 A2   4/1994
(Continued)

OTHER PUBLICATIONS

International Search Report for corresponding International Application PCT/SE2009/000231.

(Continued)

*Primary Examiner* — Roger Pang
(74) *Attorney, Agent, or Firm* — WRB-IP LLP

(57) ABSTRACT

A working machine includes a prime mover for supplying torque to the driving wheels of the working machine, and a transmission line arranged between the prime mover and the driving wheels for transmitting torque from the prime mover to the driving wheels. The transmission line includes a gearbox arranged between the prime mover and the wheels, and the working machine further includes at least one hydraulic machine in a hydraulic system for moving an implement arranged on the working machine and/or steering the working machine, and an electric machine for driving or braking the driving wheels and/or for driving or braking the at least one hydraulic machine. The electric machine is arranged in parallel with the prime mover with respect to the transmission line and is mechanically connected to the transmission line between the prime mover and the gearbox. The gearbox is a continuously variable transmission having a variator unit, and the gearbox has an operation mode where the rotation speed of the output shaft of the gearbox is zero or close to zero independently of the rotation speed of the input shaft of the gearbox at the same time as torque can be transmitted from the input shaft to the output shaft.

6 Claims, 3 Drawing Sheets

(56) References Cited

U.S. PATENT DOCUMENTS

| | | | |
|---|---|---|---|
| 6,118,237 | A | 9/2000 | Kikuchi et al. |
| 6,170,587 | B1 * | 1/2001 | Bullock ................. 180/69.6 |
| 6,705,416 | B1 | 3/2004 | Glonner et al. |
| 8,286,741 | B2 * | 10/2012 | Kawashima ............ 180/65.285 |
| 8,651,219 | B2 * | 2/2014 | Yoshida et al. ............. 180/305 |
| 2003/0205422 | A1 | 11/2003 | Morrow et al. |
| 2004/0098983 | A1 | 5/2004 | Naruse et al. |
| 2007/0187167 | A1 | 8/2007 | Mariani |
| 2011/0118077 | A1 * | 5/2011 | Kawasaki et al. ............ 477/3 |
| 2013/0066496 | A1 * | 3/2013 | Ishii ........................... 701/22 |

FOREIGN PATENT DOCUMENTS

| | | |
|---|---|---|
| WO | 2007043924 A1 | 4/2007 |
| WO | 2007055796 A1 | 5/2007 |
| WO | 2008022455 | 2/2008 |

OTHER PUBLICATIONS

JP2004133319 A, Hitachi Construction Machinery, May 26, 2005 (abstract from espacenet and original document).

* cited by examiner

WORKING MACHINE AND A METHOD FOR OPERATING A WORKING MACHINE

BACKGROUND AND SUMMARY

The invention relates to a working machine and a method for operating a working machine.

The invention is applicable on working machines within the fields of industrial construction machines, in particular wheel loaders and articulated haulers. Although the invention will be described with respect to a wheel loader, the invention is not restricted to this particular machine, but may also be used in other heavy working machines, such as dump trucks, excavators or other construction equipment.

A working machine is provided with a bucket, container or other type of implement for lifting, carrying and/or transporting a load. A working machine may be operated with large and heavy loads in areas where there are no roads, for example for transports in connection with road or tunnel building, sand pits, mines and similar environments.

A wheel loader is usually provided with a prime mover, such as an internal combustion engine, a transmission line, and a gearbox for supplying torque to the driving wheels of the wheel loader. In addition to supply torque to the driving wheels, the internal combustion engine has to supply energy to one or more hydraulic pumps of a hydraulic system of the wheel loader. Such a hydraulic system is used for lifting operations and/or steering the wheel loader.

Hydraulic working cylinders are arranged for lifting and lowering a lifting arm unit, on which a bucket or other type of attachment or working tool, for example forks, is mounted. By use of another hydraulic working cylinder, the bucket can also be tilted or pivoted. Further hydraulic cylinders known as steering cylinders are arranged to turn the wheel loader by means of relative movement of a front body part and a rear body part of the wheel loader.

In order to enable a more effective operation of a working machine and lower fuel consumption, a working machine comprising an electric machine arranged between the internal combustion engine and the gearbox has been suggested in WO 2007/043924. The hybrid working machine disclosed in WO 2007/043924 has a lot of advantages as compared to conventional non-hybrid working machines using merely an internal combustion engine for propulsion and for driving the power take off unit, i.e. the hydraulic system. However, during certain operation modes the electric machine cannot be utilized in an optimized way, and the performance of the working machine may also be restricted by other components of the transmission line.

It is desirable to provide a working machine defined by way of introduction, which working machine enables the electric machine of the transmission line to be used in a more effective way and the performance of the working machine to be improved.

By the provision of a working machine provided with a gearbox which is a continuously variable transmission having a variator unit, and wherein the gearbox has an operation mode where the rotation speed of the output shaft of the gearbox is zero or close to zero independently of the rotation speed of the input shaft of the gearbox at the same time as torque can be transmitted from the input shaft to the output shaft, the electric machine can be driven within a favourable rotation speed interval. Since the gear ratio of the gearbox can be changed continuously the electric machine can be driven at the desired rotation speed substantially independently of the requisite rotation speed of the output shaft of the gearbox. Accordingly, the electric machine can be driven at an optimal rotation of speed both when used as an electric motor and as an electric generator for example during braking.

The electric machine is arranged in parallel with the prime mover, which can be an internal combustion engine, with respect to the transmission line and is mechanically connected to the transmission line between the prime mover and the gearbox, which implies a parallel electric hybridization. (Thus, the expression "in parallel with" is here a functional description, and not any description of the relative geometrical directions of the prime mover and the electric machine.) Thereby the electric machine can also be used to provide torque to a power take off unit (PTO) of the working machine. This is of great importance since the hydraulic system of the working machine is powered via the PTO, and a considerable amount of the total energy required is used for driving the hydraulic system of a working machine.

The hydraulic system can be driven by the prime mover and/or the electric machine with the rotation speed required by the hydraulic system at the same time as the gearbox can provide the requisite torque and speed of rotation for the driving wheels.

Such a continuously variable transmission (CVT) described above is usually referred to as an infinitely variable transmission (IVT), and the current mode where the rotation speed of the output shaft of the gearbox is zero or close to zero independently of the rotation speed of the input shaft of the gear box at the same time as torque can be transmitted from the input shaft to the output shaft is usually referred to as a geared neutral. The expression "zero or close to zero" is intended to cover a speed of rotation of the output shaft which is zero or in the size of a few rotations per minute. By the geared neutral function the operation of the hydraulic system can be separated from the propulsion of the working machine independently of the prime mover or the electric machine being the power source. The propulsion force can be controlled independently of the speed of rotation of the prime mover and/or the electric machine. Furthermore, the hydraulic system can be driven by the prime mover and/or by the electric machine when the working machine stands still without using any clutch for disengagement of the prime mover and/or the electric machine relative to the transmission line. In addition, the torque converter traditionally used in working machines can be omitted, since the speed of rotation can be continuously varied down to zero by means of the gearbox. A further advantage is that the electric machine can be used as a starting motor for the prime mover.

Furthermore, an electric energy storage means can be charged by means of the electric machine driven by the internal combustion engine when the working machine stands still, and potential energy of an implement such as a bucket or container can be converted into torque on the transmission line or into energy which is stored in an electric energy storage means (also when the working machine stands still).

According to one embodiment of the invention the gearbox comprises a planetary gear wheel unit enabling the power transmitted by the gearbox to be split between the variator unit and the planetary gear wheel unit. By such a gearbox having a power split (PS), in many operation modes only a minor part of the power has to be transmitted by the variator unit. The remaining power is transmitted by the planetary gear wheel unit. This implies an improved overall efficiency since the loss of energy is considerably smaller with respect to the planetary gear wheel unit compared to the variator unit. In addition, the size of the variator unit can be reduced. Preferably, a hydraulic variator is used. Generally, a hydraulic variator has improved efficiency, reduced size and is cost-effective in comparison to an electric variator or a mechanical variator.

According to a further embodiment where the working machine comprises a further electric machine, and said at least one hydraulic machine is mechanically connected to the further electric machine to enable the hydraulic machine to be driven as a pump by said further electric machine and/or to enable said further electric machine to be driven as a generator by the hydraulic machine, the hydraulic machine does not need to have a variable displacement, since the speed of rotation can be varied with the further electric machine and be adapted to the power needed in the hydraulic system. Any losses related to rotation of the hydraulic machine at an unfavourable speed of rotation can be eliminated since the speed of rotation of the hydraulic machine is not dependent on the speed of rotation of the prime mover and/or the electric machine connected to the transmission line.

The invention relates also, according to an aspect thereof, to a method for operating a working machine comprising the step of controlling the gear ratio of the gearbox to enable the electric machine to work at a substantially constant rotation speed throughout a predetermined continuous speed interval of the output shaft of the gearbox for a given value of the power level of the electric machine. Hereby the electric machine can be driven at an optimal rotation of speed, both when used as an electric motor and as an electric generator for example during braking, which in turn improves the performance of the electric machine and thereby the performance of the working machine.

According to a further embodiment of the method, energy from the hydraulic system is recovered by braking the hydraulic machine with the electric machine, and the braking torque of the electric machine is preferably controlled so as to divide the recuperated energy into a first part which is stored in an electric energy storage means connected to the electric machine and into a second part which is transmitted to the transmission line.

Thereby it is possible to optimize the recovering procedure depending on the state of charge of the electric energy storage means and the need of power for the transmission.

According to a further embodiment of the method, the gearbox is controlled to an operation mode where the rotation speed of the output shaft of the gearbox is zero or close to zero independently of the rotation speed of the input shaft of the gearbox at the same time as torque can be transmitted from the input shaft to the output shaft. Thereby the hydraulic system can be separated from the propulsion of the working machine independently of the prime mover or the electric machine being the power source. The propulsion force can be controlled independently of the speed of rotation of the prime mover and/or the electric machine.

Further advantages and advantageous features of aspects of the invention are disclosed in the following description.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
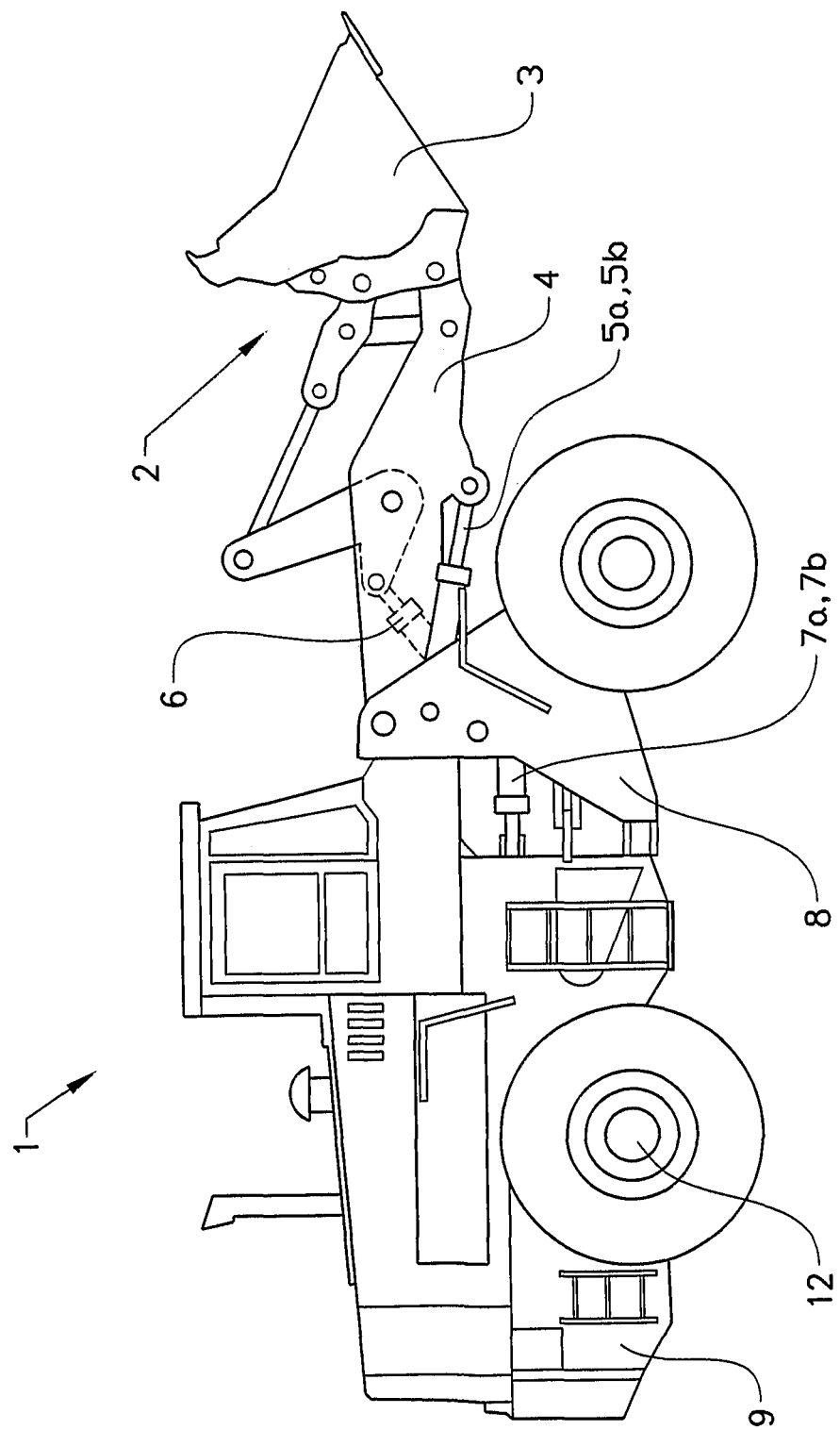
FIG. 1 is a lateral view illustrating a wheel loader having a bucket for loading operations, and a hydraulic system for operating the bucket and steering the wheel loader.

FIG. 1 is an illustration of a working machine 1 in the form of a wheel loader having an implement 2. The term "implement" is intended to comprise any kind of tool using hydraulics, such as a bucket, a fork or a gripping tool arranged on a wheel loader, or a container arranged on an articulated hauler. The implement illustrated comprises a bucket 3 which is arranged on an arm unit 4 for lifting and lowering the bucket 3, and further the bucket 3 can be tilted or pivoted relative to the arm unit 4. The wheel loader 1 is provided with a hydraulic system comprising at least one hydraulic machine (not shown in FIG. 1). The hydraulic machine can be a hydraulic pump, although it is preferred that the hydraulic machine can work as a hydraulic pump as well as a hydraulic motor with a reversed flow of hydraulic fluid. Such a hydraulic machine with said both functions can be used as a pump for providing the hydraulic system with hydraulic fluid, for example to lift and tilt the bucket, and as a hydraulic motor for recuperation of energy, for example during a lowering operation of the implement 2. In the example embodiment illustrated in FIG. 1 the hydraulic system comprises two hydraulic cylinders 5a, 5b for the operation of the arm unit 4 and a hydraulic cylinder 6 for tilting the bucket relative to the arm unit 4. Furthermore the hydraulic system comprises two hydraulic cylinders 7a, 7b arranged on opposite sides of the wheel loader for turning the wheel loader by means of relative movement of a front body part 8 and a rear body part 9. In other words; the working machine is frame-steered by means of the steering cylinders 7a, 7b.

Figure 2:
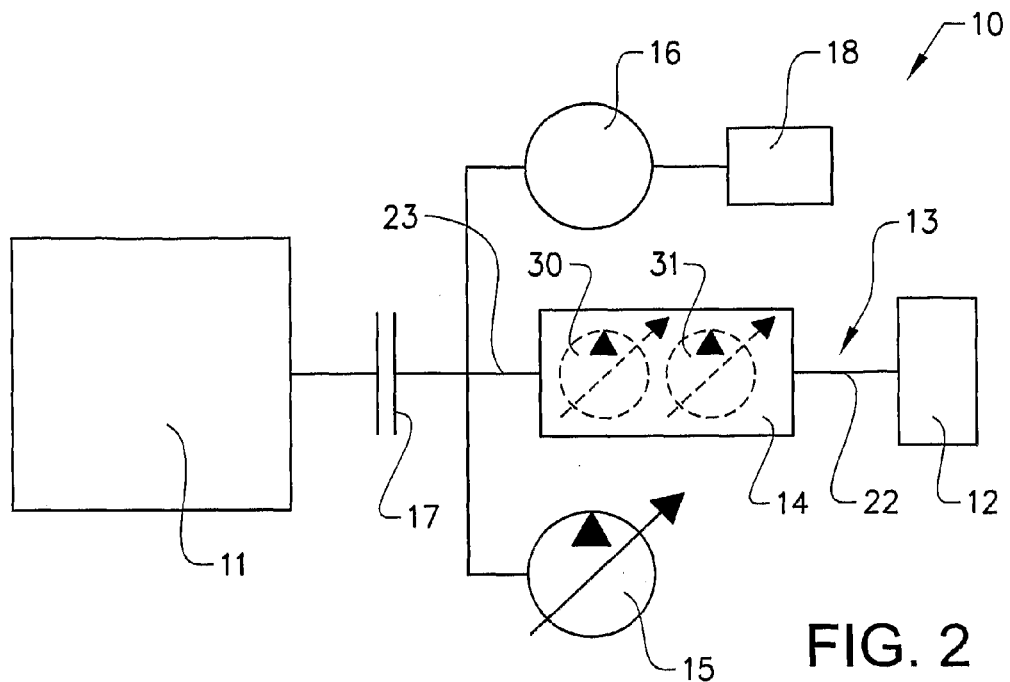
FIG. 2 is a schematic illustration of a drive train of a working machine according to an aspect of the invention.

FIG. 2 is a schematic illustration of a drive train 10 of the working machine 1 illustrated in FIG. 1. The working machine 1 comprises a prime mover 11 for supplying torque to the driving wheels 12 of the working machine, and a transmission line 13 arranged between the prime mover 11 and the driving wheels 12 for transmitting torque from the prime mover 11 to the driving wheels 12. The driving wheels 12 are schematically illustrated in FIG. 2. However, any number of wheels and wheel axles can be used in the working machine according to the invention. For example, there can be one front axle and one rear axle as illustrated in FIG. 1 and some or all of the wheels can be driven wheels.

Although the prime mover 11 is preferably an internal combustion engine (ICE), for example a diesel engine, other prime movers such as for example Stirling engines can also be used. The transmission line 13 comprises a gearbox 14 arranged between the prime mover 11 and the driving wheels 12.

In FIG. 2 said at least one hydraulic machine 15 for moving the implement 2 arranged on the working machine 1 and/or for steering the working machine 1 is schematically illustrated. The working machine can be equipped with one or more hydraulic machines for providing the hydraulic fluid required. The working machine 1 further comprises an electric machine 16 for driving or braking the driving wheels 12 and/or for driving or braking said at least one hydraulic machine 15. By the term "electric machine" is meant a combined electric motor and generator. The electric machine 16 can be driven by electricity to supply an output torque on a shaft or be mechanically driven by applying torque on a shaft of the electric machine for producing electricity. Thus, the electric machine 16 can be used as an electric motor for providing torque to the transmission line 13 and as an electric generator. Energy can be recovered by braking the transmission line 13 and/or from the hydraulic system by braking the hydraulic machine 15 by means of the electric machine 16.

The electric machine 16 is arranged in parallel with the prime mover 11 with respect to the transmission line 13, and mechanically connected to the transmission line 13 between the prime mover 11 and the gearbox 14. The electric machine 16 can be used for example to provide torque when a discrepancy between the torque provided by the prime mover 11 and the torque requested by an operator of the working machine 1 is detected. The electric machine 16 can also be used as a starting motor for the prime mover 11.

In the example embodiment illustrated in FIG. 2 also the hydraulic machine 15 is mechanically connected to the transmission line 13 between the prime mover 11 and the gearbox 14. The transmission line 13 may also comprise a transmission component 17 for engagement and disengagement of the prime mover 11 relative to the driving wheels 12. The transmission unit 17, which preferably is a mechanical clutch, can be arranged between the prime mover 11 and the electric machine 16 to enable the prime mover to be disconnected and still allowing the electric machine to interact with the transmission line 13 and/or the hydraulic machine 15. In the case the hydraulic machine 15 is connected to the transmission line 13, via a power take off unit (PTO) for instance, the transmission component 17 is preferably arranged between the prime mover 11 and the hydraulic machine 15 to enable the prime mover to be disconnected without disconnecting the hydraulic machine 15.

In the example embodiment illustrated in FIG. 2, both the electric machine 16 and the hydraulic machine 15 are mechanically connected to the transmission line 13 in a way enabling the electric machine to provide power to the transmission line and/or to the hydraulic machine 15. The electric machine 16 can also be used in order to recover energy from the transmission line 13 and/or from the hydraulic system via the hydraulic machine 15, which recovered energy can be stored in an electric energy storage means 18. In addition, the electric machine 16 can be driven by the prime mover 11 in order to store energy in the electric energy storage means 18. In a similar way the hydraulic machine 15 can provide power to the transmission line 13 and/or to the electric machine 16 during an energy recovering operation related to the hydraulic system, and the hydraulic machine 15 can be driven by the electric machine 16 and/or the prime mover 11 for providing the requisite power to the hydraulic system.

Figure 3:
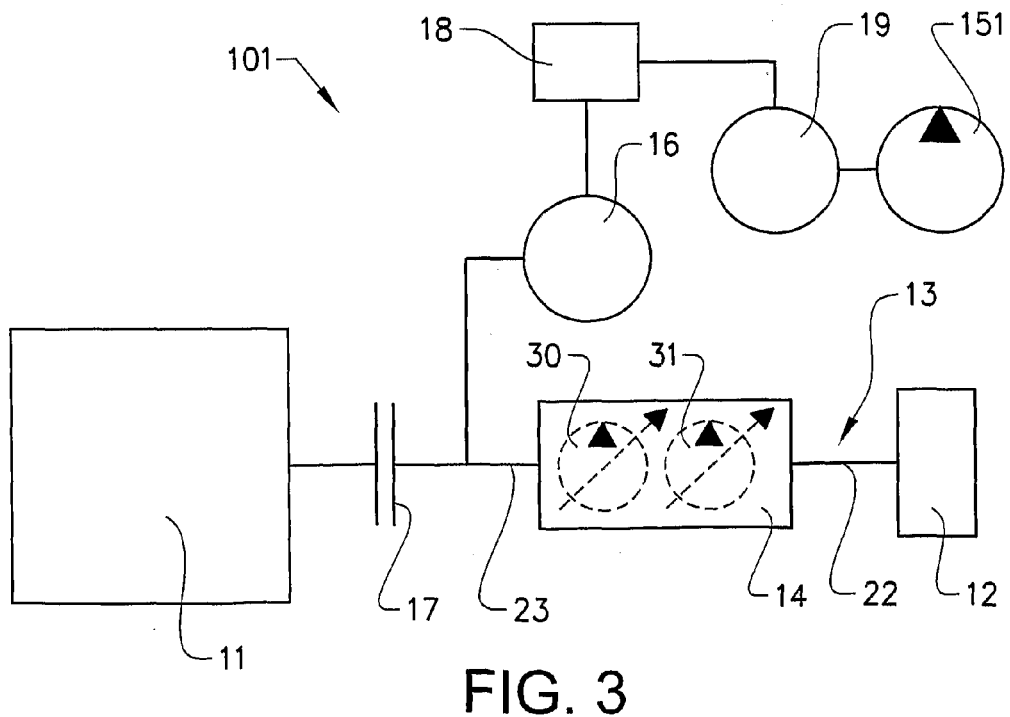
FIG. 3 is a schematic illustration of a modified drive train of a working machine according to an aspect of the invention.

In the example embodiment illustrated in FIG. 3 the hydraulic machine 151 is not mechanically connected to the transmission line 13, but connected to and driven by a further electrical machine 19. This electric machine 19 is preferably electrically connected to the electrical energy storage means 18 or to another energy storage means. The electric energy storage means 18 is preferably arranged to provide energy to the further electric machine 19 when this electric machine functions as an electric motor for driving the hydraulic machine 151, and to store energy when this electric machine 19 functions as a generator driven by the hydraulic machine 151. As regards the remaining features of the drive train 101 illustrated in FIG. 3 reference is made to the description above with respect to the example embodiment illustrated in FIG. 2.

Figure 4:
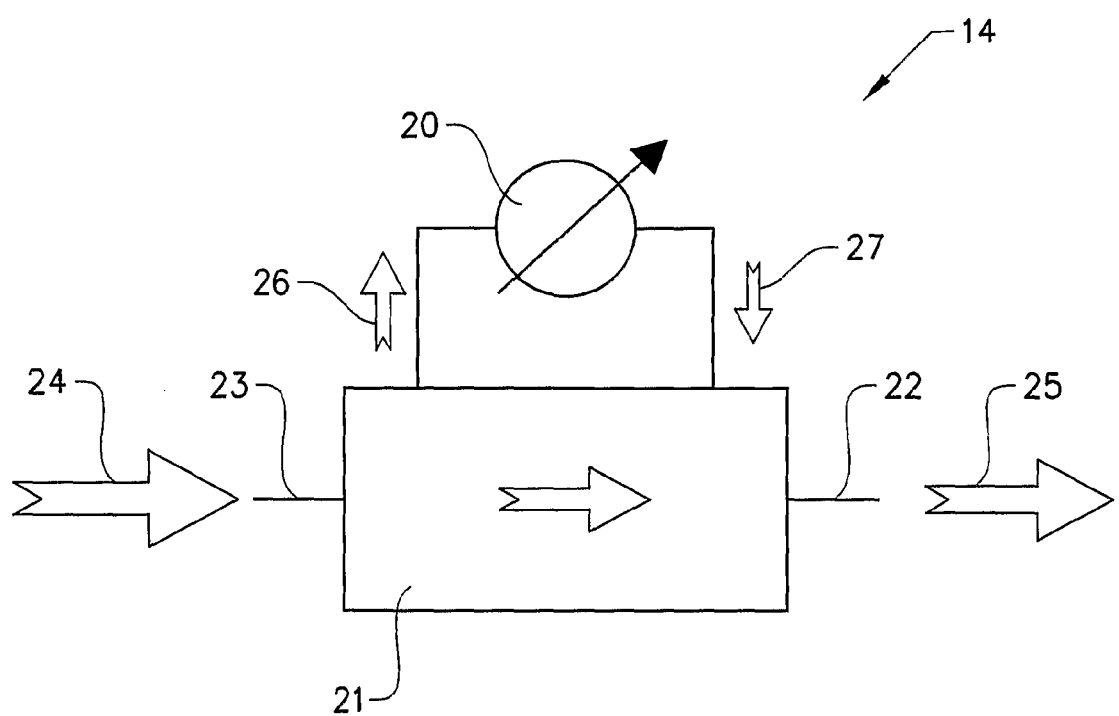
FIG. 4 is a schematic illustration of a gearbox which is a continuously variable transmission with power split to be used in a working machine according to an aspect of the invention.

FIG. 4 is a schematic illustration of the gearbox 14. The gearbox 14 can be used together with both main example embodiments illustrated in FIGS. 2 and 3. The gearbox is a continuously variable transmission (CVT) with geared neutral (GN) and power split (PS).

The geared neutral implies that there is an operation mode of the gearbox where the rotation speed of the output shaft 22 of the gearbox 14 is zero or close to zero independently of the rotation speed of the input shaft 23 of the gearbox 14 at the same time as torque can be transmitted from the input shaft 23 to the output shaft 22 of the gearbox. Thus, also in the example embodiment illustrated in FIG. 2 the hydraulic machine 15 can be driven when the working machine stands still since the speed of rotation of the output shaft of the gearbox can be zero or close to zero by means of the geared neutral function.

The gearbox 14 has a variator unit 20 and a planetary gear wheel unit 21. The variator unit 20 is preferably a hydraulic variator. Although the variator unit can be designed in different ways, the variator unit preferably comprises two hydraulic machines 30, 31 (see FIGS. 2 and 3) and at least one of these hydraulic machines has a variable displacement. The power transmitted by the gearbox 14 is shown by arrows 24, 25, 26, 27. As schematically illustrated the power can be split between the variator unit 20 and the planetary gear wheel unit 21. The power in-arrow 24 is somewhat larger than the power out-arrow 25 due to losses in the gearbox 14. The loss of energy mainly arises in the variator unit 20 which is also indicated by a somewhat larger arrow 26 before the variator unit than the arrow 27 after the variator unit. In some operation conditions all power may however be transferred through the variator unit 20.

It should be stressed that the current design of the gearbox is just one example of such a transmission. The design can be varied in many different ways. For example, the transmission may have an input-split, an output-split, or a compound-split, or combinations thereof.

It is to be understood that the present invention is not limited to the embodiments described above and illustrated in the drawings; rather, the skilled person will recognize that many changes and modifications may be made within the scope of the appended claims.

The invention claimed is:

1. A method for operating a working machine having a prime mover for supplying torque to the driving wheels of the working machine, and a transmission line arranged between the prime mover and the driving wheels for transmitting torque from the prime mover to the driving wheels, the transmission line comprising a gearbox arranged between the prime mover and the wheels, the working machine further comprising at least one hydraulic machine in a hydraulic system for moving an implement arranged on the working machine and/or steering the working machine, and an electric machine for driving or braking the driving wheels and/or for driving or braking the at least one hydraulic machine, the electric machine being arranged in parallel with the prime mover with respect to the transmission line and being mechanically connected to the transmission line between the prime mover and the gearbox, wherein the method comprises
controlling the gear ratio of the gearbox to enable the electric machine to work at a substantially constant rotation speed throughout a predetermined continuous speed interval of the output shaft of the gearbox for a given value of the power level of the electric machine.

2. A method according to claim 1, wherein the method comprises the recovering energy from the hydraulic system by braking the hydraulic machine with the electric machine.

3. A method according to claim 1, wherein the method comprises controlling the braking torque of the electric machine so as to divide the recuperated energy into a first part which is stored in an electric energy storage means connected to the electric machine and into a second part which is transmitted to the transmission line.

4. A method according to claim 1, wherein the method comprises controlling the gearbox to an operation mode where the rotation speed of the output shaft of the gearbox is zero or close to zero independently of the rotation speed of the input shaft of the gearbox at the same time as torque can be transmitted from the input shaft to the output shaft.

5. A computer comprising a computer program for performing the steps of claim 1.

6. A non-volatile computer readable medium comprising a computer program for performing the steps of claim 1.

* * * * *